United States Patent
Pecher

(10) Patent No.: US 10,423,431 B2
(45) Date of Patent: Sep. 24, 2019

(54) METHODS AND SYSTEMS FOR SIMULATING A HYDROCARBON FIELD USING A MULTI-POINT WELL CONNECTION METHOD

(71) Applicant: Schlumberger Technology Corporation, Sugar Land, TX (US)

(72) Inventor: Radek Pecher, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 334 days.

(21) Appl. No.: 15/500,520

(22) PCT Filed: Jul. 31, 2015

(86) PCT No.: PCT/US2015/043223
§ 371 (c)(1),
(2) Date: Jan. 30, 2017

(87) PCT Pub. No.: WO2016/019302
PCT Pub. Date: Feb. 4, 2016

(65) Prior Publication Data
US 2017/0212773 A1    Jul. 27, 2017

Related U.S. Application Data

(60) Provisional application No. 62/031,923, filed on Aug. 1, 2014.

(51) Int. Cl.
*G06F 9/455* (2018.01)
*G06Q 50/02* (2012.01)
*E21B 47/00* (2012.01)

(52) U.S. Cl.
CPC .............. *G06F 9/455* (2013.01); *E21B 47/00* (2013.01); *G06Q 50/02* (2013.01)

(58) Field of Classification Search
CPC .......... G06F 9/455; E21B 47/00; G06Q 50/02
See application file for complete search history.

(56) References Cited

U.S. PATENT DOCUMENTS 6,078,869 A    6/2000  Gunasekera
7,006,959 B1   2/2006  Huh et al.
(Continued)

FOREIGN PATENT DOCUMENTS

WO    2013/180705 A1    12/2013

OTHER PUBLICATIONS

Ding, D. Y. "Coupled simulation of near-wellbore and reservoir models." Journal of Petroleum Science and Engineering 76.1-2 (2011): 21-36. (Year: 2011).*
(Continued)

*Primary Examiner* — Jay Hann
*Assistant Examiner* — Chuen-Meei Gan
(74) *Attorney, Agent, or Firm* — Jaime A. Castano

(57) ABSTRACT

Computing systems, computer-readable media, and methods may include determining, for a hydrocarbon field, one or more formation properties and one or more fluid properties and determining, for the hydrocarbon field, a location of one or more wells and a configuration of the one or more wells. The method may include dividing the hydrocarbon field into one or more grid cells. The method may include simulating fluid flow in at least one of the one or more grid cells based on a multi-point well connection process. The multi-point well connection process may determine flow conditions between the one or more wells and the at least of the one or more grid cells. The method may include determining one or more parameters of the one or more wells based at least in part on the fluid flow.

19 Claims, 5 Drawing Sheets

(56) References Cited

U.S. PATENT DOCUMENTS 8,751,208 B2 6/2014 Brouwer et al.
2013/0073268 A1 3/2013 Abacioglu et al.

OTHER PUBLICATIONS

Ding, Yu, and L. Jeannin. "A new methodology for singularity modelling in flow simulations in reservoir engineering." Computational Geosciences 5.2 (2001): 93-119. (Year: 2001).*
Pecher, Radek. "Breaking the Symmetry with the Multi-Point Well Connection Method." SPE Reservoir Simulation Symposium. Society of Petroleum Engineers, 2015. (Year: 2015).*
International Preliminary Report on Patentability for International patent application PCT/US2015/043223 dated Feb. 16, 2017.
"Comparison of Various Techniques for Computing Well Index", Jones Shu (Aug. 2005).
Wolfsteiner, C., et al., "Calculation of Well Index for Nonconventional Wells on Arbitrary Grids", Computational Geosciences Journal Issue 7, 2003 pp. 61-82.

* cited by examiner

200

Panel 1

Panel 2

Panel 3

Panel 4

METHODS AND SYSTEMS FOR SIMULATING A HYDROCARBON FIELD USING A MULTI-POINT WELL CONNECTION METHOD

CROSS-REFERENCE TO RELATED APPLICATIONS

This application claims priority to U.S. Provisional Patent Application Ser. No. 62/031,923 filed on Aug. 1, 2014, which is incorporated by reference herein in its entirety.

BACKGROUND

Numerical simulators may include tools used by reservoir and production engineers in the process of understanding and exploiting underground oil/gas assets. The technology behind these tools may be based on describing the fluid flow throughout the reservoir and into/from production/injection wells using advanced mathematical models, coupled together via well-to-reservoir connections, and solving large systems of equations for the given operating constraints. The well-to-reservoir connections have been mathematically expressed using simple equations, known as Peaceman formulae, involving a single-point representation of the reservoir pressure near a well perforation. A number of assumptions are built into these basic formulae, including a radial fluid flow, regular or regularized geometries, fully penetrating well and its perforated segment, homogeneous rock properties within a certain, potentially large, distance from the well, and no interference from neighboring wells, among other assumptions.

SUMMARY

Embodiments of the present disclosure may provide a method. The method includes determining, for a hydrocarbon field, one or more formation properties and one or more fluid properties. The method also includes determining, for the hydrocarbon field, a location of one or more wells and a configuration of the one or more wells. The one or more wells may comprise at least one of an injecting well or a producing well. The method further includes dividing the hydrocarbon field into one or more grid cells, wherein the one or more grid cells are associated with at least one of the one or more formation properties. Additionally, the method includes simulating fluid flow in at least one of the one or more grid cells based on a multi-point well connection process. The multi-point well connection process determines flow conditions between the one or more wells and the at least of the one or more grid cells based on flow conditions between the at least of the one or more grid cells and one or more neighboring grid cells. The method also includes determining one or more parameters of the one or more wells based at least in part on the fluid flow.

In an embodiment, the at least one of the one or more grid cells may include at least one of the one or more wells and wherein the multi-point well connection process represents a connection of the at least one of the one or more grid cells and the at least one of the one or more wells as multi-point representation of reservoir pressure.

In an embodiment, the fluid flow may be determined at least in part by an equation:

$$Q_w = \sum_{i=0}^{n} C_i P_i - C_w P_w + C_s$$

where $P_w$ is a well-perforation pressure of the at least one of the one or more wells, $C_w$ is a well-perforation connection coefficient the at least one of the one or more wells, $Q_w$, is flow rate, $P_i$ is a pressure of a grid cell i, $C_i$ is a well-perforation connection coefficient of a grid cell i, $C_s$ is a flow contribution from internal sources and n is a number of neighboring grid cells.

In an embodiment, the multi-point well connection process may comprise a support flow into one or more of the neighboring grid cells.

In an embodiment, the fluid flow may be determined at least in part by an equation:

$$Q_w = \sum_{i=0}^{n} C_i P_i - C_w P_w + C_s + \sum_{i=1}^{n} D_i S_i.$$

where $D_i$ is a coefficient associated with $S_i$, and $S_i$ is a support flow rate between grid cell 0 and grid cell i.

In an embodiment, unspecified boundary conditions may be determined at least in part based on a boundary integral equation.

In an embodiment, the method may include determining, based at least in part on the one or more parameters, a location of a new well in the hydrocarbon field.

Embodiments of the present disclosure may provide a non-transitory computer readable storage medium storing instructions for causing one or more processors to perform a method. The method includes determining, for a hydrocarbon field, one or more formation properties and one or more fluid properties. The method also includes determining, for the hydrocarbon field, a location of one or more wells and a configuration of the one or more wells. The one or more wells may comprise at least one of an injecting well or a producing well. The method further includes dividing the hydrocarbon field into one or more grid cells, wherein the one or more grid cells are associated with at least one of the one or more formation properties. Additionally, the method includes simulating fluid flow in at least one of the one or more grid cells based on a multi-point well connection process. The multi-point well connection process determines flow conditions between the one or more wells and the at least of the one or more grid cells based on flow conditions between the at least of the one or more grid cells and one or more neighboring grid cells. The method also includes determining one or more parameters of the one or more wells based at least in part on the fluid flow.

Embodiments of the present disclosure may provide a system. The system may include one or more memory devices storing instructions. The system may also include one or more processors coupled to the one or more memory devices and configured to execute the instructions to perform a method. The method includes determining, for a hydrocarbon field, one or more formation properties and one or more fluid properties. The method also includes determining, for the hydrocarbon field, a location of one or more wells and a configuration of the one or more wells. The one or more wells may comprise at least one of an injecting well or a producing well. The method further includes dividing the hydrocarbon field into one or more grid cells, wherein the one or more grid cells are associated with at least one of the one or more formation properties. Additionally, the method includes simulating fluid flow in at least one of the one or more grid cells based on a multi-point well connection process. The multi-point well connection process determines flow conditions between the one or more wells and the at least of the one or more grid cells based on flow conditions between the at least of the one or more grid cells and one or more neighboring grid cells. The method also includes determining one or more parameters of the one or more wells based at least in part on the fluid flow.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
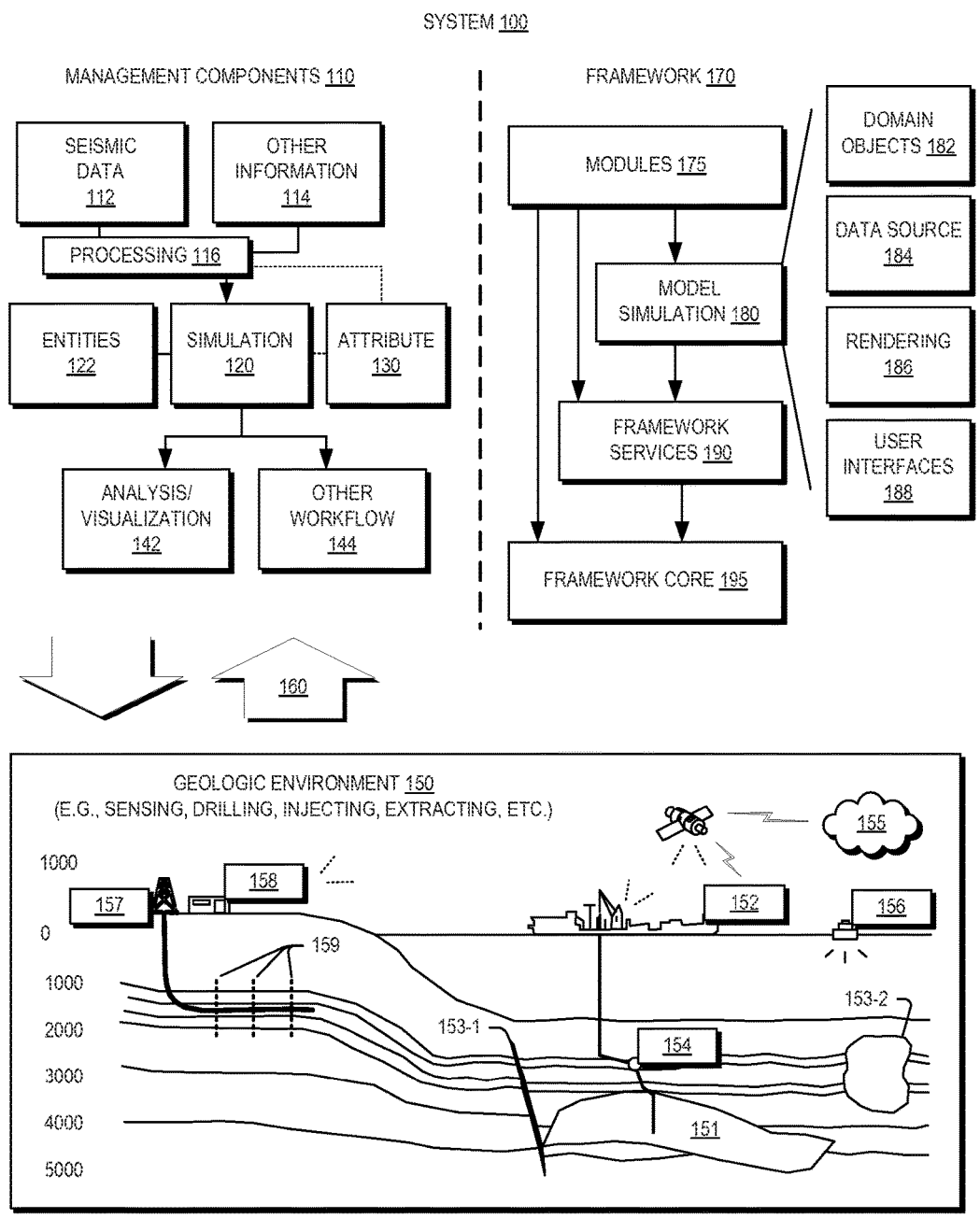
FIG. 1 illustrates an example of a system that includes various management components to manage various aspects of a geologic environment according to an embodiment.

Reference will now be made in detail to the various embodiments in the present disclosure, examples of which are illustrated in the accompanying drawings and figures. The embodiments are described below to provide a more complete understanding of the components, processes and apparatuses disclosed herein. Any examples given are intended to be illustrative, and not restrictive. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/ B/B/C, A/B/C, etc. In addition, throughout the specification, the meaning of "a," "an," and "the" include plural references. The meaning of "in" includes "in" and "on."

It will also be understood that, although the terms first, second, etc. may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

When referring to any numerical range of values herein, such ranges are understood to include each and every number and/or fraction between the stated range minimum and maximum. For example, a range of 0.5-6% would expressly include intermediate values of 0.6%, 0.7%, and 0.9%, up to and including 5.95%, 5.97%, and 5.99%. The same applies to each other numerical property and/or elemental range set forth herein, unless the context clearly dictates otherwise.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 may include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes may be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that may output information for use in increasing reservoir performance, for example, by improving asset team productivity. Through use of such a framework, various professionals (e.g., geophysicists, geologists, and reservoir engineers) may develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software may include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications may display their data while the user interfaces 188 may provide a common look and feel for application user interface components.

As an example, the domain objects 182 may include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project may be accessed and restored using the model simulation layer 180, which may recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

As described above, the system 100 may be used to simulate or model a geologic environment 150 and/or a reservoir 151. In embodiments, the system 100 may be used in field development planning. In embodiments, the system 100 may be used to simulate or model a hydrocarbon field ("field"). In embodiments, the system 100 may use a multi-point well connection ("MPWC") method to simulate or model the field. In embodiments, the system 100 may use the MPWC method to simulate or model fluid flow in subterranean hydrocarbon reservoirs of the field. In embodiments, the system 100 may use simulated or modeled fluid flow in planning and implementing wells in the field.

As described herein, a well cell may be indicate a grid cell with one or more well perforations acting as fluid sources or sinks and mathematically representing coupling contacts between the reservoir grid model and the well model. As described herein, multi-point well connection ("MPWC") may indicate a connection between a well and a number of grid cells in its (topological or functional) vicinity. As described herein, MPWC may also be referred to as multi-connection. The presence of MPWC may indicate (but not necessitate) a support flow across the well cell faces. As described herein, support flow may indicate artifact flow between a well cell and its neighbors, balancing the difference between a more rigorous flow description and its discrete approximation. Support flow may provide additional degrees of freedom for "breaking the symmetry" of the local pressure field. Support flow may channel any solution asymmetry from the well cell model out to the adjacent cells, causing a corresponding distortion of the pressure profile outside the cell. As described herein, MPWC method or ("MPWCM") may include a mathematical method for describing and evaluating the well-reservoir coupling by means of multi-connections and support flow.

The flow of multi-phase fluid through permeable rock may be mathematically described in terms of nonlinear partial differential equations (PDEs), which may be solved by applying numerical techniques, such as the finite volume method (FVM). The reservoir domain may be discretized into a grid of cells, each having its own rock and fluid properties. Unknown pressure, temperature, and fluid composition distributions may be approximated by cell-wise constant functions of space, evolving in time along finite timesteps, thus converting the PDEs into a large set of nonlinear algebraic equations to be solved iteratively. The main force acting on the reservoir fluid may come from production and injection wells, which represent sinks and sources in the material balance equation for each cell containing well connections. The perforations of the production and injection wells may mathematically represent coupling contacts between the two major models: the reservoir model of fluid flow through porous media and the well model of fluid flow through pipes. The well-to-reservoir coupling of the two models may be given by the equation:

$$Q_w = C(P_i - P_w). \tag{1}$$

where $Q_w$ may be the fluid flow-rate through the well-to-cell connection, $P_i$ may be the reservoir pressure in the coupling cell i, $P_w$ may be the wellbore (bottom-hole flowing) pressure at some reference well depth, and C may be the coupling coefficient, otherwise known as the well index or well connection transmissibility factor (when the fluid mobility is set to 1). The coefficient C may be referred to as the productivity/injectivity index, and may combine the connection transmissibility (also known as well index, in case of wells with single connections) and the fluid mobility. The value of C may reflect the cell-well geometry and local rock properties.

C may be based on a quantity termed the equivalent radius of a well block. The equivalent radius may be one method for selecting some representative value for $P_i$ from a radial pressure profile logarithmically proportional to the distance from the flowing well. Another approach may be based on a real averaging of the pressure profile; the difference may be a factor of 1.7 in the selected distance from the well. The interpretation of $P_i$ may be governed by two factors: (1) taking a single value for the cell pressure from a (highly) non-uniform distribution around the well may be considered an upscaling process; (2) the coupling equation (Eq. 1) may need additional information that would provide a local reference for a more accurate description.

The model described above may involve a number of assumptions: stabilized flow in the well cell, single-phase fluid, undistorted radial fluid flow, regular geometries, vertical well perforated across the entire permeable layer, homogeneous/isotropic rock properties, and no interference from neighboring wells. A few of these assumptions may be relaxed: non-square grids and anisotropic permeability, off-center wells and multiple wells in the cell, and multiple cells with flowing wells. All of these models may use the concept of equivalent radius and may tune the expression for C so as to adapt it to the more general cases. Varying the magnitude of C, however, may not fully capture the spatial asymmetry in the pressure distortions.

Equation (1) may be a generic form of well-to-reservoir coupling equations, including "classical Peaceman", "projected Peaceman", "Stanford semi-analytical approach" and others. The focus of all these existing approaches may be on the coefficient C, attempting to improve its validity by lumping more and more non-uniformities from around the well connection into its value via complicated expressions. For example, the classical Peaceman formula may include anisotropy in the rock permeability of cell i. This changes the magnitude of C by means of a non-trivial expression involving square roots and a logarithm, however the final effect of this coupling equation has no directional impact on the cells outside cell i because the vector (or tensor) information may be lost in the single-point reservoir pressure description in terms of the scalar term $CP_i$.

In embodiments, the MPWC method, for example, utilized by system 100, may modify Equation (1) by extending the direct communication between the well and the well's physically connected cell further to other cells not necessarily containing the well's perforations. In embodiments, the other cells may be any cells in the reservoir grid. In some embodiments, for example, the other cells may include the cells closest to the well connection, e.g., the cells directly attached to the faces of the well cell. In some embodiments, for example, the other cells may include cells indirectly attached to the faces of the well cell. The MPWC may remove the assumptions, described above, from the mathematical model by describing each well-to-reservoir connection in terms of a set of general formulae expressing a multi-point representation of reservoir pressure in which the individual coefficients capture any non-uniformity in geometry and rock properties around a well perforation, as well as any influence from the surrounding wells.

Figure 2:
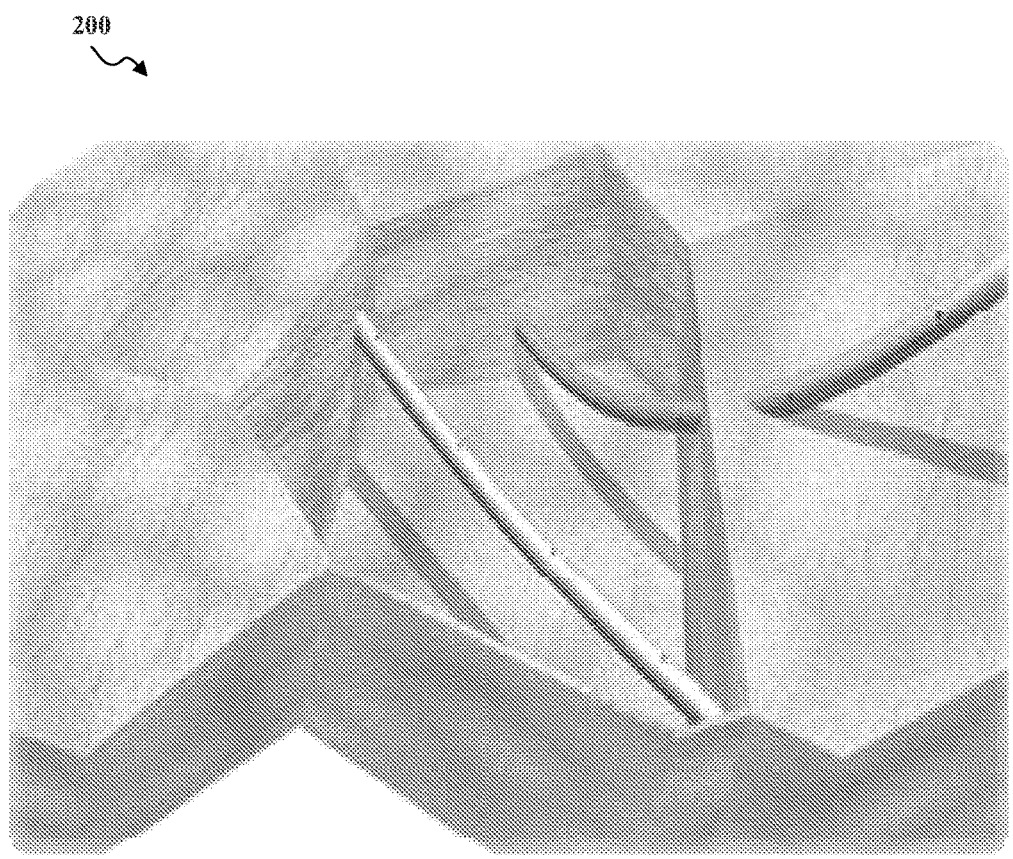
FIG. 2 illustrates examples of asymmetries in a field according to an embodiment.

In embodiments, the MPWC method may not require any upscaling, but may still reflect all asymmetries in cell geometry (skewed and unstructured-grid cells), well geometry (slanted and curved wells, off-center and multiple wells), connection geometry (partial and multiple perforations, hydraulic fractures), local rock properties (heterogeneity and anisotropy), and external sources (nearby wells and aquifers). FIG. 2 illustrates some examples of asymmetries in a field. The MPWC method may combine attributes of the field by capturing the true geometry of the coupling cell and its well perforations, internal anisotropy and external heterogeneity of the local rock properties, and the effect of pressure gradients in the vicinity of the cell, such as those caused by nearby wells. The MPWC method may be based on a new form of the coupling equation (Eq. 1) that may represent a boundary-integral solution of the local problem of single-phase fluid flow inside the well cell containing well perforations and bounded by its neighboring cells. In the context of FVM, the boundary conditions may correspond to cell pressures and inter-cell flow rates at any given time during the model evaluation. The boundary element method (BEM), applied to the local problem, may use cell-wise constant FVM quantities and may provide analytically accurate solutions at both steady and pseudo-steady states in the well cell (while the rest of the reservoir is at the transient regime). The MPWC method may propagate solution asymmetry across the faces of the coupling cell based on the multi-point approach. Extension to fully transient flow regimes within the well-connection cell (e.g., to model low-permeability high-viscosity scenarios) may be determined.

In embodiments, two MPWC models may be used in the MPWC method. One of the two formulations may propagate internal asymmetry (such as irregular well/cell geometry, etc.) outside the well-connection cell, at the additional expense of a new inter-cell quantity (called support flow) to be solved for. Both MPWC models may be implemented by means of a boundary-integral technique applied to a local flow problem within the well cell, giving the models their high sensitivity to geometry.

Multi-Point Approach

Consider a well that may be located exactly between two adjacent grid cells with identical shapes and rock properties. It may be concluded that the well affects both cells equally. Consider moving the well slightly into one of the cells. Although the well may be just a millimeter from the other cell, it may numerically lose its direct communication with it due to the discrete nature of the cell-wise function space. The cell containing the well, "well cell", may communicate with it directly via Eq. 1, while the other cell may be affected by the well indirectly via inter-cell flow across the shared face. In an attempt to emulate a direct communication, the transmissibility between the two cells may have to be increased greatly for the case of the well so close to the shared face. Such a change in transmissibility, to accommodate the near-face well, may represent a deviation from the original static model and may redefine the relation between the two cells.

In an extension of the example, consider three neighboring cells in a row, perhaps as part of a 1D-model grid. The three corresponding cell pressures may form a vector basis for an interpolation formula estimating pressure at any given point within the three cells. For a well located anywhere in the central cell, the interpolation formula may improve the well-to-cell coupling equation by replacing its single-point description by a (higher-order) multi-point description, involving pressures from more than one cell. As a result, the well may formally communicate (through the flow of fluid) with all the three cells directly—without changing other properties, such as the inter-cell transmissibility.

Instead of smoothing the pressure profile around the well by replacing the cell-wise constant function by its higher-order interpolation, the introduction of more "pressure points" into the coupling equation may be achieved locally within the well cell. The interpolation approach, mentioned previously, may effectively represent downscaling, associated with non-uniqueness in the choice of the basis functions and thus an uncertain outcome. A solution of the local flow problem, see the Boundary Integral Formulation section below, may be a method of coupling the well-perforation pressure, $P_w$, and flow rate, $Q_w$, with the pressure $P_i$ of the well cell i=0 and of its n neighbors i>0:

$$Q_w = \sum_{i=0}^{n} C_i P_i - C_w P_w + C_s. \quad (2)$$

$C_s$ is a flow contribution from any distributed or simulated internal sources.

Eq. 2 may encapsulate the fact that flow between the well perforation and the well cell may not be isolated, as in Eq. 1, but depends on external factors, such as presence of nearby wells, reflected in the discrete pressure profile around the well cell. Moreover, each coefficient associated with the particular "outer cell" (i>0) pressure may capture the local geometry and rock properties (including both heterogeneity and anisotropy) between the outer cell and the well cell. If, for example, the well perforation w is closer to cell 1 than to cell 2, or the permeability in cell 1 is higher than in cell 2, it is expected that $C_1 > C_2$; i.e., cell 1 may have a larger influence on the $Q_w$ vs. $P_w$ relationship than cell 2. (This conclusion may be valid for a highly conductive well cell; in case of a less conductive cell, the relation among coefficients $C_i$ in Eq. 2 may vary.)

If $C_1 > C_2$, does the well also affect cell 1 more than cell 2? In other words, if the well perforation is closer to cell 1 than to cell 2, would $P_1$ show a larger change from a uniform profile than $P_2$? The answer may be no, not for the case of Eq. 2. This is because Eq. 2 enters the overall solution process as part of the material balance equation intended to solve the unknown $P_0$; the coupling equation may be associated with the well cell and cannot be used for the same well in cell 1. When $P_1$ is being solved (e.g., its corresponding equation being added to the global system), Eq. 2 for the well in cell 0 may be ignored, and hence the well's effect may be felt only through the regular inter-cell flow rate. Another way of looking at this issue may be described as follows. Coefficients $C_{i>0}$ with different magnitudes may propagate outer asymmetries into the well cell and may influence the well coupling all differently. The well cell pressure $P_0$ may be adjusted accordingly, and the corresponding flow rates to outer cells then may reflect this change. The flow rates may be linear functions of $P_{i>0} - P_0$ and therefore maintain the same ratio, as in the symmetric case. Eq. 2 may enable outer asymmetry to affect the local flow, but may not propagate local asymmetry outside the well cell, similar to Eq. 1. This may be addressed by introducing the concept of "support flow"; the coupling equation then becomes:

$$Q_w = \sum_{i=0}^{n} C_i P_i - C_w P_w + C_s + \sum_{i=1}^{n} D_i S_i. \tag{3}$$

The support flow, $S_i$, may be an auxiliary quantity representing an artifact flow between the well cell and its neighbors, balancing the discrepancy between a more rigorous local-flow description and its discrete inter-cell approximation. D may be a support flow coefficient, which may a dimensionless term. Support flow may channel solution asymmetry from the well cell model out to the adjacent cells, causing a corresponding distortion in their pressure profile. At the same time, the support flow may provide additional degrees of freedom necessary for "breaking the symmetry" of the near-well pressure field.

The support flow may be similar to the steering flow in MPFA schemes, but may play a different role in this context. It may introduce additional unknown variables, at most n per a well cell (note: some cell faces may be neglected based on certain criteria; this needs to be further investigated), which may be the "price to pay" for the extra accuracy provided. Compared to a local grid refinement (LGR), say 3×3×3 in a cuboid cell, 6 unknown $S_i$'s may not be that costly, especially when the analytical accuracy of the local flow solution (introduced in the next section) exceeds that of the LGR. Moreover, LGRs may require much smaller timesteps due to finer spatial scales.

Eqs. 2 and 3 extend the well-to-cell coupling description from a single-cell model to a multi-cell model. The scalar limitation of a single-point connection (Eq. 1) may be removed in Eqs. 2 and 3 as a consequence of the vector character of MPWC, which may propagate near-well positional and directional asymmetry from outer cells into the well cell (Eq. 2) or both ways (Eq. 3).

Boundary Integral Formulation

A solution of a local single-phase fluid flow problem inside one FVM cell of arbitrary shape, containing one or more (say m) active well perforations of any geometry and distribution, and possibly belonging to more wells may be determined as discussed below. Let the domain of the well cell i=0 be denoted as $\Omega$ and its entire boundary $\Gamma = \partial \Omega$ be composed of n faces $\Gamma_i$ adjoining the outer FVM cells i>0 to cell 0, plus m points/curves/surfaces $\Gamma_w$ representing the well perforations. The pressure values $P_*$ of these cells or perforations, and the corresponding flow rates $Q_*$ across $\Gamma_*$, may provide boundary conditions (BCs) for the local problem. If any of the outer cells are inactive or missing, the appropriate global boundary condition may be applied instead. Conservation of the fluid mass (or moles, depending on the density $\rho$) may yield the material balance equation $$\nabla \cdot q + \frac{1}{\rho} \frac{\partial (\rho \phi)}{\partial t} = 0, \text{ in } \Omega, \text{ at } t > t', \tag{4}$$

where $\phi$ is the rock porosity, t denotes time and t' is its initial value. The macroscopic fluid velocity q in the rock pore-space may follow Darcy's law:

$$q = -K \cdot \nabla p, \quad K = \frac{k}{\mu} u_1. \tag{5}$$

As discussed herein, p and P are referred to as "pressures", but may also be termed pressure potentials, as they implicitly include the gravitational term $\rho g \Delta z$, where p and q represent the real-space quantities, while P and Q are their discrete-space counterparts.

In Eq. 5, the permeability tensor k may be assumed to be diagonal (e.g., the Cartesian coordinates in $\Omega$ are already aligned with the principal axes of the permeability tensor). Property $\mu$ may be the dynamic fluid viscosity and the unit conversion factor $\mu_1$ is specified in Table 1.

TABLE 1

| Symbol | SI Value | Field Value |
| --- | --- | --- |
| $u_1$ | 0.00852702 | 0.00632829 |
| $u_2$ | $u_1$ | 0.00112712 |
| $u_3$ | 1.0 | $u_3 = u_1/u_2$ |

Under an assumption of "small pressure gradients", the fluid density may be eliminated from Eq. 4 by means of another property, $c_t$, capturing the total compressibility of the fluid-rock system; Eqs. 4 and 5 are then combined in the pressure-diffusion equation $$\nabla \cdot (K \cdot \nabla p) - \phi c_t \frac{\partial p}{\partial t} = 0, \text{ in } \Omega, \text{ at } t > t'. \tag{6}$$

Eq. 6 may be solved for the prescribed initial and boundary conditions defined next. Both $P_i$ and $Q_i$ may be given, whereas only $P_w$ or $Q_w$ may be given while the other value is to be found:

$$p = p', \text{ in } \Omega, \text{ at } t = t', \tag{7a}$$

$p=f(P_i,P_{i\pm})$, on $\Gamma_i$, at $t \geq t'$, for outer cell $i=1,\ldots,n$, $p=P_w$, on $\Gamma_w$, at $t \geq t'$, for well perforation $w=1,\ldots,m$, (7b)

$q=Q_i/|\Gamma_i|$, on $\Gamma_i$, at $t \geq t'$, for outer cell $i=1,\ldots,n$,
$q=Q_w/|\Gamma_w|$, on $\Gamma_w$, at $t \geq t'$, for well perforation $w=1,\ldots,m$. (7c)

Here, q may represent the normal component of the velocity vector, $q \equiv q \cdot \hat{n}$, where $\hat{n}$ may be the unit outward vector normal to the boundary $\Gamma_*$, the area of which may be expressed as $|\Gamma_*|$. Generally, $\hat{n}$ may vary along a curved boundary; however, in the case of FVM cells with mostly flat faces, it may be taken as constant on each $\Gamma_i$, which somewhat simplifies the solution procedure. (Note: the Solved Examples section illustrates how the variation of $\hat{n}$ is handled on circular/cylindrical wellbore surfaces $\Gamma_w$.) Another convenient fact dictated by the FVM may be the uniformity of $P_i$ and $Q_i$ over each $\Gamma_i$, leading to further simplifications in the BEM-based formulation. At the moment, let the function $f(P_i,P_{i\pm})$ be simply $P_i$; its extension to linearly interpolated cell pressures may be discussed below in the Examples section.

This may pose a question about the continuity of p over $\Gamma$. When $P_i$ generally differs between two boundary segments $\Gamma_i$, the pressure field may become multivalued in the corresponding corner and the fluid velocity approaches infinity there. This kind of singularity may appear all over the FVM grid due to its cell-wise constant function space. As described herein, the discontinuous pressure field may cause no difficulty; the internal field $p(x \in \Omega)$ may not be explicitly required, and may not be computed.

When handling nonlinear or spatially varying material properties and distributed internal sources, the boundary-only character of BEM may encounter a domain integral that cannot be directly converted to a boundary integral, but may not appear for the local problem defined in Eqs. 6 and 7, as all material properties are spatially constant in $\Omega$, due to the FVM treatment of its cell properties. At the same time, all internal sources (specifically the well perforations) may be excluded from the domain by interpreting them as part of the boundary $\Gamma$.

At this point, before the solution of the local flow problem may be detailed, the difference equation generated by the FVM-based solver for each cell of the reservoir grid may be introduced. Here, the focus may be on the well cell 0:

$$\sum_{i=1}^{n} Q_i + \sum_{w=1}^{m} Q_w + \frac{1}{\rho} \frac{\Delta(\rho \phi V)}{\Delta t} = 0, \text{ in } \Omega_0, \text{ at } t = t' + \Delta t. \quad (8)$$

Eq. 8 may be a discrete form of Eq. 4, approximating the material balance over cell 0 of volume V at time $t'+\Delta t$, where $\Delta t$ is the timestep. The multi-phase form of the equation may include additional parameters, such as phase saturation, formation volume factor, etc., and it may be intended target for the MPWC method, except that the method itself may treat the fluid locally (in the well cell) as a homogeneous mixture of phases.

The volumetric rate of fluid flow from cell 0 into cell i, across their shared face $\Gamma_i$, may be a function of their pressure difference, inter-cell transmissibility $T_i$, and fluid mobility $M_i$. An extra term may be added, in accordance with Eq. 3, and may be the support flow $S_i$ (note: the permeability ratio $\kappa_i$ and the uniform support flow $U_i$ may be ignored: $\kappa_i:=1$, $U_i:=0$):

$$Q_i = -T_i M_i (P_i - P_0) + \kappa_i S_i + U_i. \quad (9)$$

This discrete form of Darcy's law may be used as the Neumann boundary condition in Eq. 7c for the local flow problem. Both $P_i$ and $Q_i$ may be known at any time t as a result of solving n Eqs. 8 of their respective cells. In a defined problem, only one of the two well-perforation quantities (i.e., either $P_w$ or $Q_w$) may prescribed at any given time t as part of some user-specified constraints involving group, well, and completion controls. The two cases are discussed later.

Boundary Integral Equation.

A starting point of the boundary element method, previously also known as the boundary integral equation, may be a general form of the boundary integral equation (BIE). The BIE may represent an alternative formulation of the problem originally defined in terms of PDE and its associated conditions; it may be derived from Green's second identity, involving free-space Green's functions as its kernels. For the problem defined in Eqs. 6 and 7, the kernels may be functions of space, rock and fluid properties, and optionally of time for fully transient regimes; their specific details may be deferred to section Time Dependence. To generalize, Eq. 6 may be rewritten as $$\mathcal{L}(p) = -\sigma, \quad (10)$$

and its adjoint equation, defining the corresponding free-space Green's function G, may be expressed as $$\mathcal{L}(G) = -\delta(x-x'). \quad (11)$$

The self-adjoint linear differential operator $\mathcal{L}$ may satisfy the general form of Green's second identity:

$$\int_\Omega [p \mathcal{L}(G) - G \mathcal{L}(p)] d\omega = \int_\Gamma K \cdot [p \nabla G - G \nabla p] \cdot \hat{n} \, dy. \quad (12)$$

Both Eq. 10, where $\sigma$ is any source in $\Omega$, and Eq. 11, where the Dirac delta $\delta$ represents a point source at x', may be substituted into Eq. 12, together with the definition of kernel $F \equiv F \cdot \hat{n}$ associated with G:

$$F = -K \cdot \nabla G. \quad (13)$$

Upon applying the sifting property of the delta function and rearranging, Eq. 12 becomes $$c(x') p(x') = \int_\Gamma [p(x) F(x-x') - q(x) G(x-x')] \, dy + \int_\Omega \sigma(x) G(x-x') \, d\omega. \quad (14)$$

Eq. 14 is the boundary integral equation which may be used to solve Eq. 10 subject to the prescribed boundary conditions. It may relate pressure at any given point x' to the boundary values p and q (first integral, $x \in \Gamma$) and to internal source density $\sigma$ (second integral, $x \in \Omega$); the latter is discussed in the section Time Dependence. The "contact coefficient" c may have a value of unity inside the domain ($x' \in \Omega$) and less than one, $0<c<1$, on the boundary ($x' \in \Gamma$); it may reflect the boundary geometry in the x' vicinity. Point x' may be even excluded from the closure $\Omega \cup \Gamma$ completely by setting c=0.

There may be a direct link between the BIE, represented by Eq. 14, and the MPWC, described by Eqs. 2 and 3: the latter may be particular cases of the former. Although the BIE may be just one of a number of ways how to generate the coupling equations for MPWCs (e.g., others may include LGRs), it may be more accurate and efficient.

In embodiments, in an FVM model, a grid of cells may be traversed at each solution time t and a set of (nonlinear) algebraic equations may be generated for every primary solution quantity in the cell. In a stencil of n cells attached to the central cell 0, the unknown cell pressure $P_0$ may be found by evaluating Eq. 8 (with Eq. 9) and adding it to the global residual vector (e.g., all Eqs. 8) and Jacobian matrix (e.g., the gradient of all Eqs. 8 with respect to all unknowns), which are then solved for all the unknowns. If cell 0 contains any well connections, the corresponding flow rates $Q_w$ may need to be added to the material balance, Eq. 8. The two possible constraints are: (1) value of $Q_w$ may be specified and may be directly used in Eq. 8; (2) value of $P_w$ may be specified and hence the corresponding $Q_w$ in Eq. 8 may be expressed indirectly by means of a coupling equation. In embodiments, the relationship between $P_w$ and $Q_w$ based on the MPWC method (e.g., Eq. 2 or 3) may be implemented via Eq. 14.

For example, the following analysis may assume a single well perforation in cell 0. For case (1), mentioned in the previous paragraph, there may be no need to generate Eq. 2, whereas n instances of Eq. 3 may be required to find the n unknown support flow variables $S_i$, as discussed later. For case (2), Eq. 2 may be formed once, while Eq. 3 may lead to n+1 instances: 1 for the unknown $Q_w$ and n for the unknown $S_i$'s.

To generate one Eq. 2 or 3 for a well perforation of known pressure $P_w$ (e.g., derived from the prescribed bottomhole pressure using head calculations in the wellbore), point x' may be positioned on the boundary $\Gamma_w$, representing the perforation's contact with rock, and Eq. 14 may be evaluated by carrying out the particular integrations. All quantities in Eq. 14 may be known, except the missing value of $Q_w$ introduced through q on $\Gamma_w$. Specifically, c, F and G may be computed from the geometry, while p and q may be prescribed on $\cup_i \Gamma_i = \Gamma \backslash \Gamma_w$ by means of Eqs. 7b-c. Both types of boundary conditions on $\Gamma_i$ may contain cell pressures $P_i$ (note: q indirectly via Eq. 9) which may be solved by FVM and therefore may need to be treated as unknowns when Jacobian entries are collected from Eq. 14. The final step, after all $C_i$ coefficients are computed, may be to cast Eq. 14 into the form of Eq. 2 or 3 and insert the resulting $Q_w$ into Eq. 8. In other words, the FVM equation may be used for finding the well-cell pressure $P_0$ (and other solution quantities), but its well-inflow term may capture complex near-well features causing the local flow to deviate from a pattern assumed in Eq. 1.

In some embodiments, the procedure may be extended to multiple perforations in the well cell (i.e., m>1) with the exception that even the case (1) constraint now requires its own Eq. 14 [note: if the case (1) constraint may treated as an internal source rather than a boundary condition, the extra Eq. 14 may not needed]. This is because only one from the pair of boundary conditions on $\Gamma_w$ may be prescribed, whereas the other may not be known. As multiple perforations communicate with each other, values of both $Q_w$ and $P_w$ may be available in Eq. 14 to uniquely define mutual influences between the sources. Eqs. 2 and 3 thus need to be generated from Eq. 14 for every perforation w, by positioning point x' on the corresponding $\Gamma_w$, and the resulting flow rates $Q_w$ may then be added to Eq. 8. Furthermore, each of these equations must be appended to the global solution system (residual and Jacobian) to support the unknown constraint, the value of which is to be found. Considering Eq. 3, for example, the set of m equations to solve for the [unknown($P_w$, $Q_w$)]$_{w=1}^m$ vector may be written as $$A \cdot Q_w = B \cdot P - C \cdot P_w + D \cdot S + E. \quad (15)$$

Since the support flow variables S may represent yet another set of unknowns, additional n equations (Eq. 3) may be required in the global system. The matrices and (column) vectors in Eq. 15 then have the following sizes: A=[m+n, m], $Q_w$=[m], B=[m+n, n+1], P=[n+1], C=[m+n,m], $P_w$=[m], D=[m+n,n], S=[n] and E=[m+n]. Unlike the equations to determine the missing well constraints, which may also applied in Eq. 8 to replace $Q_w$, the S-related equations may not be used anywhere else.

While generating Eqs. 3 to solve for S, point x' in Eq. 14 may be positioned near or on the well-cell face i associated with the unknown $S_i$. In general, point x' in the BIE may represent a fictitious point source whose influence on all parts of the boundary (or boundary elements) may be expressed in terms of kernels G and F. Kernel G captures the distance between x' and the integration point x, while F also reflects the local boundary orientation towards x'. Therefore, moving point x' in Eq. 14 to the vicinity of a particular feature in $\Omega \cup \Gamma$ may also move the BIE's focus on that feature. Each such new equation may be linearly independent from the others due to the strong spatial nonlinearities in the kernel functions (assuming non-degenerate x' distribution). In practical terms, this may enable generating a well-conditioned, diagonally dominant (due to singularities in BIE) set of algebraic equations for determining any unknown boundary quantities, such as p or q. In the case of support flow, the same approach may help to find $S_i$ such that its value compensates for the error in $Q_i$ (see Eq. 9) caused by the approximate FVM description of the inter-cell flow rate. By positioning point x' in Eq. 14 near or on the cell face $\Gamma_i$, the BIE may be instructed to focus on the relation between the face's $P_i$ and $Q_i$. As these quantities may be given (e.g., solved elsewhere), the BIE's analytical "expectation" of their relationship results in adjusting the free parameter associated with the face, i.e. the support flow $S_i$.

In some embodiments, for example, two adjacent FVM cells both may contain well perforations. When one of these cells is being processed as cell 0 while the other supplies its $P_i$, the support flow $S_i$ associated with their shared face may be adjusted according to the BIE model of cell 0 only. In other words, the $Q_i$ compensation via $S_i$ may not reflect fluid sources and sinks located within cell i. As there may only be one value of $S_i$, balancing the flow from both sides of the face, the two cells may be merged while evaluating Eq. 14 for this particular $S_i$. The local-flow problem domain thus may combine the two cells, $\Omega = \Omega_0 \cup \Omega_i$, with possibly different rock and fluid properties. The so-called concept of zones may be applied to such sectionally heterogeneous media, while considering when the permeability-anisotropy directions differ in the two zones. No more than two cells may need to be merged for each $S_i$, even though well perforations may appear in more or all of the outer cells. This is because each particular $S_i$ may be associated with the face $\Gamma_i$ shared only by two cells: the well cell 0 and the outer cell i.

Returning to a general case of any well-cell model, three additional conditions may be secured to make sure that the support flow represents a correct complement to the inter-cell flow given by Eq. 9. Firstly, $S_i$ may be restricted by the permeability of the outer cells, while no support flow may be expected for completely non-conductive cells as the extreme case. This may be achieved by multiplying $S_i$ by the permeability ratio $\kappa_i$ appearing in Eq. 9 and defined as $\kappa_i = \max(K_i \cdot \hat{n} \cdot K_0^{-1}, 1) \approx \max(k_i/k_0, 1)$ for $\mu_i \approx \mu_0$ and $k \rightarrow k$. (16a)

The maximum function may prevent amplification of $S_i$ for more conductive outer cells, as the well cell is controlling the flow. The first term in Eq. 16a may apply generally for anisotropic media and fluid viscosity varying strongly between cells, whereas the second term may assume neither of those cases and gives $\kappa_i$ its simplified name.

The implementation of Eq. 16a in the BIE via Eq. 9 may require care while applying the equations. In all instances of these equations, $\kappa_i$ may follow Eq. 16a, except in one particular instance where it may be forced to unity. This instance may be Eq. 15 to find $S_i$ for which $\kappa_i$:=1, while, in the same equation, $\kappa_j$ associated with all the other outer cells (j≠i) comes from Eq. 16a by default. The interpretation of this exception may be: Eq. 14, producing Eq. 15 for $S_i$, may find the correct compensation of $Q_i$ from the well-cell's viewpoint, ignoring the target-cell's properties, which do not apply locally. These properties may be taken into account later in terms of the correct $\kappa_i$ (Eq. 16a), which restricts the maximum $S_i$ "suggested" by the specially treated Eq. 9 while forming the corresponding Eq. 15.

The second condition may be explained by considering a well with a prescribed flow rate. When $Q_w$ is given, the material balance over the well cell may be defined and may not be violated. Due to the FVM-introduced pressure discontinuities at the well-cell faces (i.e., between $P_0$ and $P_i$ on $\Gamma_i$), the overall support flow may become nonzero, $|\Sigma_i S_i| \gg 0$, and therefore may cause an imbalance in the total flow from/into the cell: $\Sigma_i Q_i \neq -Q_w$ (at steady-state, see Eq. 8). To handle this, a compensation may be used via the following "uniform support flow"

$$U_i = -\frac{\kappa_i A_i}{\sum_i \kappa_i A_i} \sum \kappa_i S_i, \quad (16b)$$

where $A_i = |\Gamma_i|$ is the face area. The idea behind Eq. 16b is to sum up the individual support flows in a bulk flow and then compensate for it by its complement, uniformly distributed among all faces according to their "conductance".

In some embodiments, to prevent any artifact fluid source caused by excess/shortage in the total support flow, the uniform support flow defined in Eq. 16b may be added to Eq. 9 in all instances, except one an instance when Eq. 15 may be generated for the corresponding unknown $S_i$. In that particular case, $U_i$ may be set to zero, while the other values of $U_j, j \neq i$, should again use Eq. 16b. This exception may be analogous to the previously discussed $S_i$ condition, and its explanation is also similar: When Eq. 14 generates Eq. 15 for the unknown $S_i$, its target value may not be "hindered" by any compensations that are supposed to be applied afterwards.

The third condition that may need to be addressed is to ensure that the support flow does not duplicate any flows resulting from differences in outer-cell pressures, which may be handled strictly by the FVM-based Eq. 8. To accomplish that, any background support flow computed by means of Eq. 15 for all internal sources "turned off" may be subtracted from the support flow computed for the sources "turned on". The role of the support flow may be to redistribute flow from/to the internal sources to/from non-default outer cells, as compared to the homogeneous flow distribution imposed by Eq. 1. Although the total amount of well inflow/outflow may differ due to the S-induced changes in pressure, S should clearly exclude inter-cell flow corresponding to the pressure variation around the well cell (and not caused by sources in the well cell).

To implement a source-only, rather than total, support-flow computation, the S-related n Eqs. 15 may be applied twice with the same coefficients B and D: (1) to compute the background flow without any sources, and (2) to compute the net flow caused by well-cell sources only. In the first case, coefficients A and C may be set to zero in Eqs. 15, effectively removing all well flow from the equations. Such equations may be resolved immediately, e.g., not necessarily as part of the global system, to obtain the values of the background support flow $\overline{S}_i$. In the second case, the regular coefficients A and C computed from the BIE may be used in Eq. 15, and the unknown S-variables may be replaced by the sum of net and background support flow: $S \rightarrow S + \overline{S}$. Hence, the "new" S-unknowns, resolved as part of the global system, may reflect only flow between wells and the appropriate outer cells.

In some embodiments, the unknown variables $P_w$ and $Q_w$ for multiple perforations in a cell, and $S_i$ may be generalized. A possibility of an alternative formulation may avoid the need for introducing these unknowns and solving for them as part of the global system. During the time-stepping process, at each new time $t = t' + \Delta t$, the solution from the previous time $t'$ may be fully known and thus available for any direct computations. When Eq. 8 is being assembled and the values of $Q_w$ are needed, any quantities in Eq. 14, which would require additional BIEs added to the global solution system may be taken from the solution at the previous time level. This may represent a mixed time-level scheme. Such an approach may eliminate the need for adding Eqs. 15 to the global system. Another possibility may be to keep the implicit character of the local-flow model, but carry out the solution of Eqs. 15 locally rather than globally. This may correspond to a multi-scale (or multi-grid) approach to PDE solving, where the coarse scale may be the FVM grid and the fine scale may be the BEM-based model of each well cell. In that case, Eqs. 15 may be resolved immediately when their unknowns may be needed in Eq. 8, using the latest global solution values at time t and current Newton step (or nonlinear solver iteration). Further local updates may be frozen after a specified number of Newton steps in order to allow the global system to reach convergence. The set of Eqs. 15 may be small, only m+n unknowns where both numbers are of the order of ten, and therefore a direct solver may be the preferred choice.

In some embodiments, various techniques may be used to evaluate the integrals in Eq. 14. Analytical expressions for simple kernels to specialized Gaussian quadratures may be used to deal with integrable singularities, such as the logarithmic singularity in 2D. The initial step may be finding the boundary point x closest to x', splitting the boundary segment/patch around it, and if x=x', treating the integral in the Cauchy principal value sense. In some embodiments, several options may be used for a choice of the actual x' location on the local boundary ($\Gamma_i$ or $\Gamma_w$). There may be several options for where to position point x' on $\Gamma_i$, including geometric centroid, inter-cell connector, or "everywhere"—in a double convolution integral sense.

In some embodiments, well skin factor, s, may be an auxiliary reservoir engineering (RE) concept which extends existing well-to-cell coupling equations, such as Eq. 1, to damaged (s>0) or stimulated (s<0) wells by assuming a layer of rock with permeability $k_s$ around the well perforation, with $k_s < k$ and $k_s > k$ for the two respective cases of well skin. Although the MPWC-based coupling equations (Eqs. 2 and 3) may use more complex models than Eq. 1, the well skin may be added to them by modifying the boundary conditions $P_w$ and $Q_w$ in Eqs. 7b-c by using a Robin-type BC. Dynamic, or flow-dependent, well skin may extends the skin concept by adding turbulent and inertial effects of high-velocity near-well flow regimes, usually around gas wells. Forchheimer correction may be applied to the Darcy flow Eqs. 5 and 9, generalizing them to equations of non-Darcy fluid flow. All equations involving the flow velocity q or rate Q, such as Eqs. 4, 7c, 8 and 14, may be affected by the additional flow-dependent term and lead to extended forms of the equations derived from them, including Eqs. 6, 10, 11 and 13. These equations may be linearized, so that the previously described solution procedure may be extended to non-Darcy flow regimes.

In embodiments, the boundary integral formulation may be sensitive to the geometry of the local domain, e.g., shape of the well cell and distribution/shapes of its well perforations. In embodiments, internal solutions in the domain itself may not be required—only the boundary distribution of pressures and velocities may be sought, thereby reducing the number of unknowns. The BIE may be a suitable tool for the MPWC representation; no upscaling/downscaling may be involved. In Eqs. 7c, 9 and 14, no assumption may be made about the value of $P_0$. As mentioned previously, Eq. 1 may need to postulate a certain value for the well-cell pressure, for example, based on the pressure equivalent radius. In the MPWC method, the value of $P_0$ may enter the model as part of the boundary conditions for the local problem, and those may be fully consistent with the global FVM-based description of the reservoir.

Time Dependence

The boundary integral equation, Eq. 14, may represent an integral formulation of the local flow problem defined generally by Eq. 10. The particular forms of kernels G and F may depend on the differential operator $\mathcal{L}$; once it is specified, together with the internal source σ, the BIE may be evaluated to provide the coupling equation for MPWCs (Eq. 2 or 3). Three time-models are discussed in the following subsections, presented in the order of their increasing time dependence.

Steady State

Pressure diffusion in anisotropic media, with no time dependence, may be described by the Laplace equation (see also Eq. 10):

$$\mathcal{L}(p) \equiv \nabla \cdot (K \cdot \nabla p), \quad \sigma=0. \tag{17}$$

The particular expressions for the free-space Green's functions G and F that satisfy the adjoint system, Eqs. 11 and 13, are listed below for both 2D and 3D domains; see Eqs. A-4.

Two points, x and x', in a Euclidean space of two or three dimensions may have geometric distance $$r=\sqrt{(x-x')^2+(y-y')^2} \text{ in 2D}, \quad r=\sqrt{(x-x')^2+(y-y')^2+(z-z')^2} \text{ in 3D}, \tag{A-1}$$

and "anisotropic distance"

$$R = \sqrt{\frac{(x-x')^2}{K_x} + \frac{(y-y')^2}{K_y}} \text{ in 2D}, \tag{A-2}$$

$$R = \sqrt{\frac{(x-x')^2}{K_x} + \frac{(y-y')^2}{K_y} + \frac{(z-z')^2}{K_z}} \text{ in 3D},$$

in a medium described by a diagonal tensor K, see Eq. 5. Another measure to be utilized may be the normal component of their positional vectors' difference $$r_n = (x-x') \cdot \hat{n}, \tag{A-3}$$

where $\hat{n}$ is the unit outward vector normal to the local boundary: $\hat{n}(x) \perp \Gamma(x) \wedge \hat{n} \cdot \hat{n}=1$.

The function G, which satisfies Eq. 11 where $\mathcal{L}$ is the Laplacian, and the corresponding function F, which represents a normal component of F defined in Eq. 13, may have the following expressions:

$$G = \frac{-\ln R}{2\pi\sqrt{K_x K_y}}, \quad F = \frac{r_n}{2\pi\sqrt{K_x K_y} R^2} \text{ in 2D}, \tag{A-4a}$$

$$G = \frac{1}{4\pi\sqrt{K_x K_y K_z} R}, \quad F = \frac{r_n}{4\pi\sqrt{K_x K_y K_z} R^3} \text{ in 3D}. \tag{A-4b}$$

Similarly, function G, satisfying Eq. 11 where $\mathcal{L}$ is the modified Helmholtz operator (discussed in section Transient State), and its corresponding function F, may be expressed, as follows:

$$G = \frac{K_0(R\sqrt{\phi c_t/\Delta t})}{2\pi\sqrt{K_x K_y}}, \tag{A-5a}$$

$$F = \frac{r_n \sqrt{\phi c_t/\Delta t}\, K_1(R\sqrt{\phi c_t/\Delta t})}{2\pi\sqrt{K_x K_y}\, R} \text{ in 2D},$$

$$G = \frac{\exp(-R\sqrt{\phi c_t/\Delta t})}{4\pi\sqrt{K_x K_y K_z}\, R}, \tag{A-5b}$$

$$F = \frac{r_n(1+R\sqrt{\phi c_t/\Delta t})\exp(-R\sqrt{\phi c_t/\Delta t})}{4\pi\sqrt{K_x K_y K_z}\, R^3} \text{ in 3D}.$$

In Eq. A-5a, $K_0$ and $K_1$ are the modified Bessel functions of second kind and of order 0 and 1, respectively.

As a consequence of the zero internal source, the domain integral in Eq. 14 may vanish, leaving behind just the boundary integral to be processed.

The steady-state model may assume that the fluid flow is stabilized not only locally in the well cell, but also throughout the entire reservoir, and hence the accumulation term in Eq. 8 may be omitted. This model may be suitable for testing MPWCs' sensitivity to asymmetric setups.

Pseudo-Steady State.

The pseudo-steady state model may assume a stabilized flow regime within the well cell, and a transient flow regime outside the cell (e.g., in the rest of the reservoir). Eq. 10 may compensate for the additional accumulation term in Eq. 8 by treating it as an internal sink, so that the material balance in the local flow problem is consistent with the FVM description:

$$\mathcal{L}(p) \equiv \nabla \cdot (K \cdot \nabla p), \quad \sigma = -\phi c_t \frac{\Delta P_0}{\Delta t}. \tag{18}$$

The expressions for the kernels G and F may be identical to those of the steady-state model, namely Eqs. A-4. However, the domain integral in Eq. 14 may be dealt with.

To avoid domain integration and restore the boundary-only character of the BIE, the domain integral may be converted to a boundary integral by applying the (Gauss-Ostrogradsky) divergence theorem. This may be possible only because σ is constant in Ω and because G, in both 2D and 3D, may be a relatively simple function at steady state. The conversion is given by the formula:

$$\int_\Omega \sigma G \, d\omega = \frac{1}{2} \sigma \int_\Gamma r_n (G+a) \, d\gamma, \qquad (19)$$

$$\alpha = \begin{cases} \left(4\pi \sqrt{K_x K_y}\right)^{-1} & \text{in 2D} \\ 0 & \text{in 3D} \end{cases},$$

where $r_n$ is defined in Eq. A-3 and G in Eqs. A-4.

The pseudo-steady state model may cover scenarios in which the well-cell diffusivity $K/(\phi c_t V)$ may be large enough for the local flow to reach a steady regime within a fraction of timestep $\Delta t$ since the last change in the well control constraints. The existing well-to-cell coupling models represented by Eq. 1 assume stabilized flow in the well cell, although some of them update their coefficients frequently to approximate evolution in time. The same may hold for the pseudo-steady state model described here, with dynamic updates due to the pressure variables of the surrounding cells built directly into the MPWC coupling formulae.

Transient State

Certain classes of problems, such as low-permeability and high-viscosity scenarios, may require the local flow problem to be treated as time-dependent. In that case, the transient pressure-diffusion equation (Eq. 6) may be converted to the integral form of Eq. 14, and its time-derivative term may need a special treatment. Three basic types of $\partial_t p$ treatments may include: convolution in time, integral transform (e.g., Laplace transform), and time-stepping process. The first two approaches may avoid the domain integral, but may expect smooth solution variation in time. The third approach may include a domain integral, but its time-derivative handlinr may be identical to that of FVM, and may be consistent with Eq. 8. The linear differential operator $\mathcal{L}$ and the internal source σ of Eq. 10 in the time-difference form become:

$$\mathcal{L}(p) \equiv \nabla \cdot (K \cdot \nabla p) - \phi c_t \frac{p}{\Delta t}, \quad \sigma = \phi c_t \frac{p'}{\Delta t}. \qquad (20)$$

This $\mathcal{L}$ may be known as the modified Helmholtz operator, and its corresponding free-space Green's function (based on Eq. 11) may involve a modified Bessel function in 2D, Eq. A-5a, and an exponential function in 3D, Eq. A-5b.

The pressure p' at previous-time level $t'=t-\Delta t$ may be a function of space, and therefore the domain integral may not be converted to a boundary integral (although techniques, such as the dual-reciprocity or multiple-reciprocity BEM may provide mechanisms for doing so). To numerically evaluate the domain integral, the well-cell domain Ω may be tessellated into auxiliary finite elements, and their approximation of the p' field may be integrated over each element using its basis functions. The auxiliary mesh/grid may not introduce any new unknowns; it only facilitates evaluation of the domain integral. The p' distributions in all well cells may be stored between timesteps. Pressure values inside the domain may be obtained using the same boundary integral equation, Eq. 14, as are pressure values on the boundary, except that the contact coefficient now represents a full contact of point x' with the domain by setting c=1.

Figure 3:
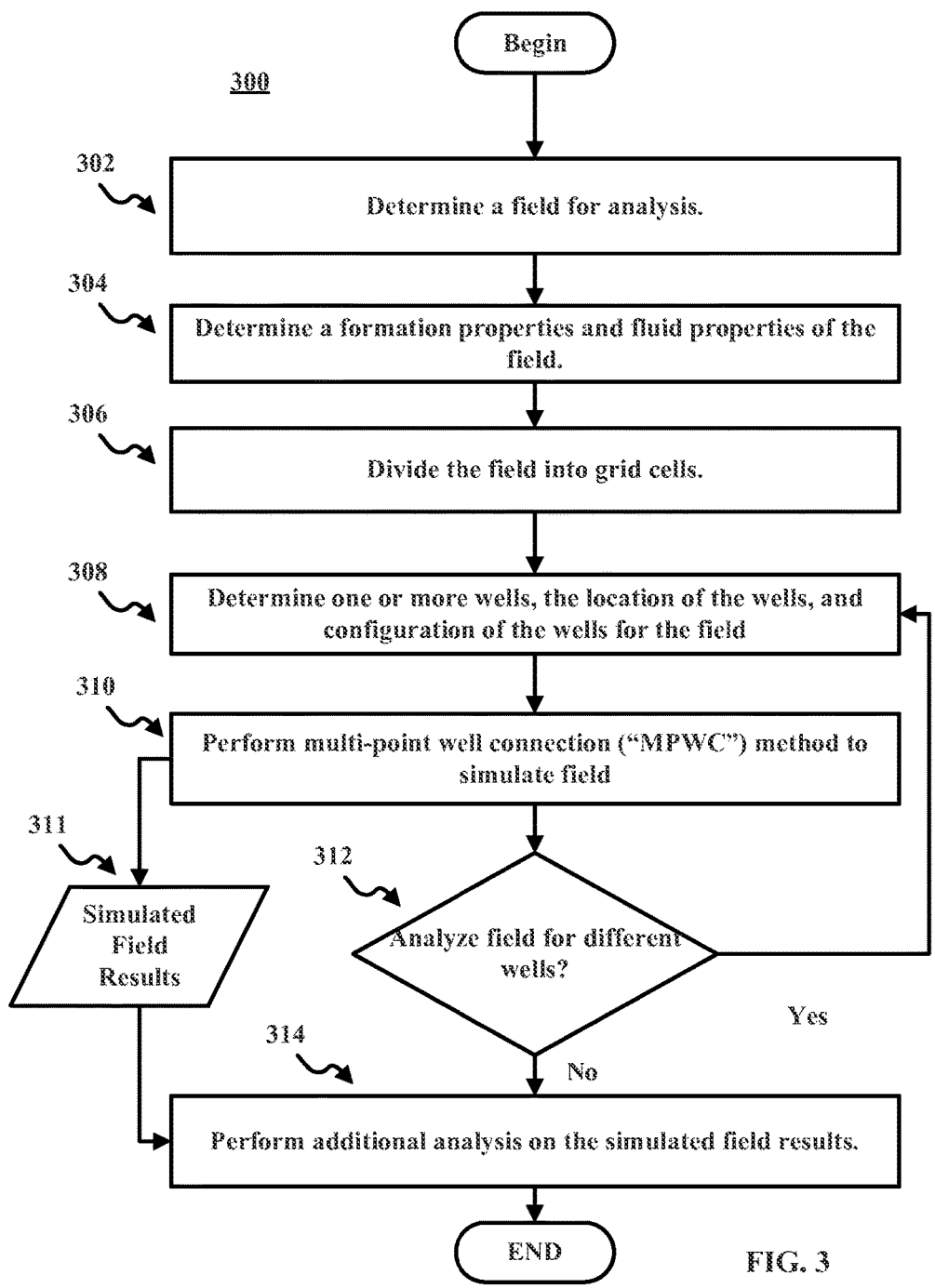
FIG. 3 illustrate a flowchart of a method for evaluating a hydrocarbon field using a multi-point well connection method according to an embodiment.

FIG. 3 illustrates a flowchart of a method 300 for evaluating a hydrocarbon field using a MPWC method. The illustrated stages of the method are examples and any of the illustrated stages may be removed, additional stages may be added, and the order of the illustrated stages may be changed.

In 302, a field may be determined for which to simulate the operation of the field. In some embodiments, for example, a user of the system 100 may select a field to evaluate. In some embodiments, for example, the system 100 may automatically select a field for evaluation.

In 304, formation properties and fluid properties may be determined for the field. In some embodiments, a user may specify the formation properties and fluid properties. In some embodiments, the formation properties and fluid properties may be determined by the system 100, for example, using data measured, sensed, collected, etc. by the system 100. In some embodiments, the formation properties and fluid properties may be stored by the system 100 and may be retrieved by the system 100.

In some embodiment for example, the formation properties may include rock properties such as permeability, porosity, geometry of the rock, anisotropies in the rock, and any other geological properties of the field. The fluid properties may include fluid density, composition, pressures in the wells, and any other physical properties that describe fluids in the field.

In 306, the field may be divided into grid cells. In some embodiments, for example, the reservoir domain may be tessellated into grid cells. In some embodiments, the grid cells may be small segments of generally irregular geometry. In some embodiments, the grid cells may be assigned rock properties, for example, the formation properties determined in 304. In some embodiments, the rock properties may vary between grid cells.

In 308, one or more wells, location of the one or more wells, and configurations of the one or more wells may be determined for the field. In some embodiments, the one or more wells may include existing wells in the field. In some embodiments, the one or more wells may include one or more new wells proposed for the field. In some embodiments, for example, the one or more wells may include injection wells. In some embodiments, for example, the one or more wells may include production wells.

In some embodiments, the location of the one or more wells may include the grid cell in which the one or more wells are located. In some embodiments, the configuration of the one or more wells may include the type of wells (e.g., injection or production), the shape of the one or more wells, the dimensions of the one or more wells, number and type of perforations in the one or more wells, and the like.

For example, the one or more wells may intersect any number of cells along the well's trajectory of arbitrary shape. In some embodiments, grid cells containing well perforations, e.g. well-to-reservoir connections, may represent coupling contacts between the mathematical models describing the well's segments and the reservoir grid.

In 310, the multi-point well connection method may be performed to simulate operations in the field. As described above, the formation properties, the fluid properties, one or more wells, location of the one or more wells, and configurations of the one or more wells may be utilized to simulate fluid flow within the field and to simulate operation of the field.

In some embodiments, for example, at least one of the one or more wells may be selected to simulate and evaluate parameters of the at least one of the one or more wells. In some embodiments, the formation properties, the fluid properties, one or more wells, location of the one or more wells, and configurations of the one or more wells may applied to Equation (2), as discussed above, to simulate and evaluate parameters of the at least one of the one or more wells. In some embodiments, for example, the formation properties, the fluid properties, one or more wells, location of the one or more wells, and configurations of the one or more wells may applied to Equation (3), as discussed above, to simulate and evaluate parameters of the at least one of the one or more wells. In embodiments, for example, the MPWC method may utilize the boundary integral, as discussed above, to determine boundary conditions in the grid cells. For example, the MPWC method may utilize the boundary integral, as discussed above, to determine unspecified boundary conditions in the grid cells, which may not be defined in the formation properties, the fluid properties, one or more wells, location of the one or more wells, and configurations of the one or more wells In embodiments, for example, the MPWC method may produce simulated field results 311 that include the parameters of the at least one of the one or more wells simulated by the MPWC method. The simulated field results 311 may include fluid flow in the formation, pressure at the one or more wells, and fluid flow at the one or more wells, and any other parameters that represent operation of the one or more wells. In some embodiments, for example, the simulated field results may include data that represents operation of the field at a single point in time. In some embodiments, for example, the simulated field results may include data that represents operation of the field over time.

In 312, the field may be analyzed for different wells or well configurations. In some embodiments, for example, a different well from the one or more wells may be selected for evaluation. In some embodiments, for example, a location and configuration of at least one of the one or more wells may be modified and evaluated. In some embodiments, for example, one or more new wells may be added to the field and evaluated.

If the field is further analyzed, the method 300 may return to 308 and repeat the MPWC process for the different wells or well configurations. If analysis is complete, the process may proceed to 314. In 314, further analysis may be performed on the simulated field results 311. In some embodiments, for example, the simulated field results 311 may be displayed for analysis by a user. For example, the simulated field results 311 may be displayed in different formats for analysis by the user such as a numerical representation of the simulated field results, a graphical representation of the field results and the like. In some embodiments, for example, the simulated field results 311 for a specified time may be displayed and analyzed. In some embodiments, for example, the simulated field results 311 over a specified period of time may be displayed and analyzed. In some embodiments, for example, the simulated filed results may be stored by the system 100 or transmitted to other computer system. In some embodiments, for example, the simulate field results 311 may be used to plan installation of new wells, operations of existing wells, and the like.

Figure 4:
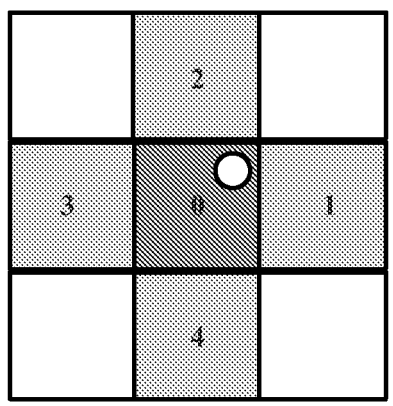
FIG. 4 illustrates examples of results from the multi-point well connection method according to an embodiment.
Figure 4:
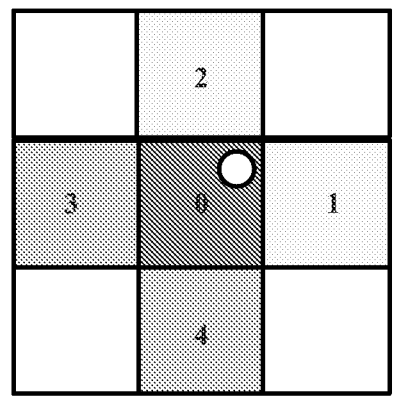
Figure 4:
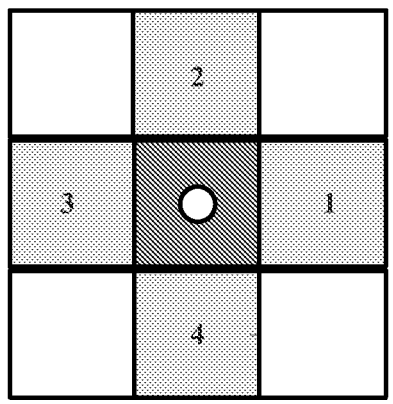
Figure 4:
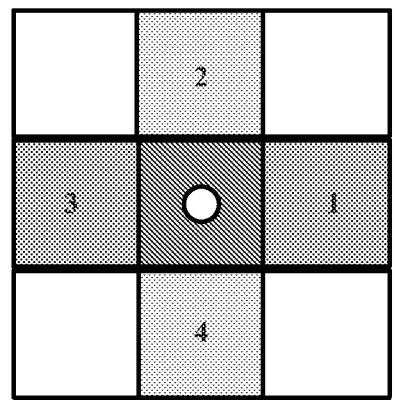

FIG. 4 illustrates an example of flow determined using the MPWC method as compared to Equation 1. Panel 1 illustrates pressure distribution due to an off-center injection well as determined by Equation (1): $p_1=p_2=p_3=p_4$. Panel 2 illustrates pressure distribution due to the off-center injection well as determined by Equation (3): $p_1=p_2>p_3=p_4$. Panel 3 illustrates pressure distribution due to a $k_x>k_y$ anisotropy in the well cell with an injection well in the center, as determined by Equation (1): $p_1=p_2=p_3=p_4$. Panel 4 illustrates pressure distribution due to a $k_x>k_y$ anisotropy in the well cell with an injection well in the center, as determined by Equation (3): $p_1=p_3>p_2=p_4$.

EXAMPLES

The discussion below describes four examples of the MPWC method performed using experiential data for a test field.

Example 1

The aim of the first example is to compare accuracy of the proposed MPWC models (Eqs. 2 and 3) against a published analytical solution as well as results from a commercial numerical simulator. During the discussion of this example, the models defined by Eqs. 2 and 3 may be referred to as the "S-free" and "S-based" models, respectively. The problem to solve and the test field may be a steady flow of liquid through a square-shaped reservoir, surrounded by a constant-pressure aquifer, towards a single producing vertical well in the center. In this example, the geometry and the rock/fluid properties may be defined as: L=100 ft, A=L$^2$, h=10 ft, $r_w$=0.5 ft, k=5 md, $\phi$=0.5, $c_t$=10$^{-5}$ 1/psi, $\mu$=0.5 cP, B=1 RB/STB, $P_i$=1,000 psi, and $Q_w$=100 STB/D. In this example, the flowing wellbore pressure may be described by the formula:

$$P_w = P_i - \frac{1}{2}\ln\left(\frac{16A}{\gamma C_A r_w^2}\right)\frac{141.2B\mu Q_w}{kh}, \quad (21)$$

where $\gamma$=1.781 is the exponential of Euler's constant and $C_A$=30.88 is the shape factor for a well in the center of a square reservoir. Applying the data and evaluating, the wellbore pressure value may be found as: $P_w$=339.05 psi.

Next, the boundary-integral approach based on Eq. 14 may be performed. The boundary integral equation (Eq. 14) applied to a simple two-dimensional, steady-state problem of a square reservoir with a single producing well in the center and surrounded by a constant-pressure aquifer, may be expressed as a zero sum of two integrals:

$$0 = I_{w,w} + I_{w,i}. \quad (B\text{-}1)$$

The zero value on the left-hand side may come from $c(x')=0$ for the point x' positioned in the center of a circle representing the well boundary $\Gamma_w$. This "no contact" case, representing a line-source approximation of a cylindrical source in 3D, may be an interpretation of the BIE and the evaluation of integral $I_{w,w}$ may be as follows:

$$I_{w,w} = \int_0^{2\pi r_w}\left(p_w\frac{-r_w}{2\pi KR^2} - q_w\frac{-\ln R}{2\pi K}\right)d\gamma = -p_w + q_w\frac{r_w\ln(r_w^2/K)}{2K}. \quad (B\text{-}2)$$

The kernels G and F in Eq. 14 may replaced by their 2D steady-state specializations (Eq. A-4a) applied to isotropic media (K→K) and using r=$r_w$ and R=$r_w$K$^{-2}$ for their distances defined in Eqs. A-1 and A-2, respectively. The distance vector r=x-x' may be a constant radial direction perpendicular to the boundary $\Gamma_w$ but oriented towards the domain $\Omega$; hence, its outward-normal component is negative: $r_n=-r_w$. Although the direction of $\hat{n}$ varies with $\gamma$, $r_n$ itself may be independent of $\gamma$, which may be a simplification arising from circular and spherical $\Gamma_w$'s in 2D and 3D, respectively. If the active well perforation surface has a more complex curvature, the normal distance $r_n$ may be expressed as a function of $\gamma$ and the integral may be evaluated numerically. Alternatively, the curved boundary $\Gamma_w$ may be split into flat boundary elements which would provide analytical expressions for integrals with simple kernels, such as those in Eqs. A-4.

The second integral in Eq. B-1 may make use of the rotational symmetry when point x moves along the outer square boundary and point x' still resides in the middle of the domain. Given the simplification that the aquifer pressure $p_i$ may be uniform around the reservoir, the eight identical boundary integrals over the edge-halves may be written as $$I_{w,i} = 8 \int_0^{L/2} \left( p_i \frac{L/2}{2\pi K R^2} - q_i \frac{-\ln R}{2\pi K} \right) d\gamma. \tag{B-3}$$

In this case, however, the distance between points x and x' may be dependent on $\gamma$, $$r=\sqrt{(L/2)^2+(L/2-\gamma)^2}, R=r/\sqrt{K}, \tag{B-4}$$

while the outward-normal component stays constant, $r_n=L/2$. Eq. B-3 may be evaluated analytically as $$I_{w,i} = p_i + q_i \frac{L\{\ln[L^2/(2K)] + \frac{\pi}{2} - 2\}}{\pi K}. \tag{B-5}$$

The normal fluxes $q_w$ and $q_i$ may be assigned from the prescribed well flow rate $Q_w$ according to the following formulae, $$q_w = \frac{Q_w B}{2\pi r_w h} u_3, \tag{B-6}$$

$$q_i = \frac{-Q_w B}{Lh} u_3,$$

where the unit conversion factor $u_3$ is listed in Table 1. Upon applying the geometric dimensions and rock/fluid properties from the first solved example into Eqs. B-2, B-5, and B-6, with $p_*=P_*$, and solving Eq. B-1 for $P_w$, its value may be found to be 331.09 psi.

The requirement of spatially constant $q_i$ (but not necessarily $p_i$, as demonstrated in the third solved example) built into the proposed MPWC method may originate from the intention to keep the number of newly introduced unknowns low. This may provide a straightforward coupling of the BEM-based local-flow model with the FVM-based reservoir-flow model by means of outer-cell pressures $P_i$ and inter-cell flow rates $Q_i$ (see Eq. 9). The required values of transmissibility and mobility may calculated for the examples as $$T_i = k_i h_i u_2, \tag{B-7}$$

$$M_i = \frac{1}{B\mu},$$

assuming two-dimensional domain, single-phase fluid, and constant viscosity.

When the S-based model is considered, the additional Eqs. 15 may be required for determining the four support flow rates $S_i$ may be generated from Eq. 14 adapted to the square-shaped domain, as follows:

$$\tfrac{1}{2}P_i=I_{i,w}+I_{i,i}+2I_{i,i\pm1}+I_{i,i\pm2}. \tag{B-8}$$

The cells may be counted sequentially around the well cell, and their indices may naturally cycle when reaching the extrema. Point x' may be positioned on face/edge i, which is reflected in the half-domain contact on the left-hand side of Eq. B-8. A number of discrete choices may be available for the actual x' location, whereas a continuously varying location leads to double convolutions:

$$I_{i,*} = \frac{1}{|\Gamma_i|} \int_{\Gamma_i} \int_{\Gamma_*} [pF(x-x') - qG(x-x')]d\gamma d\gamma', \tag{B-9}$$

$$x' \in \Gamma_i, x \in \Gamma_*.$$

The following may the particular forms of such integrals for the problem under investigation:

$$I_{i,w} = q_w \frac{r_w \{2\ln[L^2/(2K)] + \pi - 4\}}{4K}, \tag{B-10}$$

$$I_{i,i} = q_i \frac{L[\ln(L^2/K) - 3]}{4\pi K},$$

$$I_{i,i\pm1} = p_i \frac{\ln(4) + \pi}{8\pi} + q_i \frac{L[2\ln(2L^2/K) + \pi - 6]}{8\pi K},$$

$$I_{i,i\pm2} = p_i \frac{\pi - \ln(4)}{4\pi} + q_i \frac{L[\ln(L^2/K) + \pi - 3]}{4\pi K}.$$

For illustration purposes, one numerically evaluated Eq. B-8 (for i=1) may be given as:

$$3.46571\ P_0-1.21385\ P_1-0.713848\ P_2-0.824166$$
$$P_3-0.713848\ P_4+6.33338\ S_1+7.93178$$
$$S_2+8.55142\ S_3+7.93178\ S_4+7.65905\ Q_w=0 \tag{B-11}$$

Eq. B-1 in the S-based model may have the following coefficients, $$3.45307\ P_0-2.45307\ P_i-P_w+30.6362\ S_i+0.969969$$
$$Q_w=0, \tag{B-12}$$

where $P_i$ and $S_i$ apply to each face/edge due to the symmetry (i.e., their coefficients are sums of the four equal contributions). Setting $S_i:=0$ may convert Eq. B-12 directly from the S-based model to the S-free model.

Using the above process the value of $P_w$=331.09 psi may be determined. The same $P_w$ value may be obtained when the square domain is treated as a well cell and gets surrounded by eight outer cells of the same geometry, four of which adjoining its faces/edges i=1, . . . , 4. The cell pressures $P_i$ may be assigned the aquifer pressure value of 1,000 psi and may represent Dirichlet boundary conditions for the local problem, see Eq. 7b. The Neumann boundary conditions (Eq. 7c) may be supplied to cell 0 by means of inter-cell flow rates, described by Eq. 9 in an S-based model or with $S_i:=0$ in an S-free model, in the form of Eq. B-6 for this particular problem setup. Eq. 9 may introduce a new unknown into the mathematical model, not appearing in Eqs. B-1-6, namely the well-cell pressure $P_0$. As mentioned previously, the MPWC method may avoid making any assumption on the relation between $P_0$, $P_w$ and $Q_w$, unlike the existing approaches based on Eq. 1 (e.g., using the concept of equivalent radius). The MPWC method may couple the BEM-based model of the well cell (Eq. 14 yielding Eq. B-1), to find the unknown $P_w$, with the FVM-based model of the well-cell's neighborhood (represented by Eq. 8), to find the unknown $P_0$. Eq. 8 may be applied to the symmetric problem under consideration simplifies (with Eq. B-7) to $$Q_w = 4 \; TM(P_i - P_0) = 0.450848(P_i - P_0), \tag{22}$$

and therefore may give $P_0$=778.2 psi. The outcome of the BEM-based local model may not affect the value of $P_0$ in this case at all, because $Q_w$ is prescribed whereas $P_w$ is to be found. If the well control was swapped (e.g., $P_w$ prescribed and $Q_w$ to be found), the value of $P_0$ resulting from Eq. 8 may depend on the outcome of the well-cell model as a consequence of adding Eq. 14 to Eq. 8 through the corresponding $Q_w$. In either case, no new unknowns may be introduced in the S-free model for a single active well perforation in the well cell as described above for multiple perforations.

In the S-based model, up to n new unknown support flow rates $S_i$ may be added to the local well-cell model in order to redistribute the otherwise uniform well flow in accordance with various (inner and outer) asymmetries. The S-based model may not produce results that differ than those of the S-free model. The concrete forms of two Eqs. 15 for this model may be detailed in Eqs. B-11 and B-12, which, for the same value of $P_0$ as stated before, yield the solution: $S_i$=0.0912 STB/D and $P_w$=333.89 psi. The support flow may help to improve the accuracy of $P_w$ by adjusting the inter-cell flow rates $Q_i$.

Closer inspection of the overall material balance in the well cell, however, may indicate that the symmetric nonzero $S_i$ value leads to a difference between the prescribed well flow rate, $Q_w$=100 STB/D, and the inter-cell flow rates, $-\Sigma_i Q_i$=99.6352 STB/D. This may be corrected by involving the uniform support flow rate $U_i$, defined in Eq. 16b, according to the procedure described along with the equation. When the uniform support flow rate is expressed as $U_i = -\frac{1}{4}\Sigma_i S_i$ and inserted into Eq. 9 (with the described exceptions), the new value of the support flow rate may become $S_i = -U_i$=0.4428 STB/D. At the same time, the updated values of $P_0$, $P_w$ and $Q_w$ may return to the above-mentioned values computed by the S-free model. This occurs because the support flow rate may be practically eliminated from all $Q_i$'s for this symmetric problem setup. In non-symmetric cases, where the resulting $S_i$ differs from face to face, the preservation of material balance through $U_i$ may leave non-zero net support flows in the corresponding $Q_i$'s, in agreement with the local asymmetries.

Example 2—Time-Dependent Flow

The parameters from Example 1 may be used to test the pseudo-steady state description of transient fluid flow by means of Eqs. 18 and 19. As such, the wellbore pressure over time may be determined. In some embodiments, the wellbore pressure over time may be plotted to determine when the wellbore pressure reaches steady state. For this particular example, the true stabilization time may appear to be roughly 0.5 day, and the pseudo-steady state approximation behind Eq. 18 may be acceptable for timesteps of one day and more. If the transient effects in the well cell dominate the simulation timesteps, the fully transient MPWC model represented by Eq. 20 may be used.

Example 3—Outer Asymmetry Acting on a Well Cell

The Examples 1 and 2 illustrates the MPWC method when applied to a symmetric problem setup. Example 3 may introduce an external asymmetry (e.g., not caused by the well cell itself), by means of a linear pressure gradient between two constant-pressure boundaries at different pressure potentials, 100 psi and 1,900 psi. The overall geometry and rock/fluid properties may be the same as in Example 1 and 2, but the well in the middle may be converted into an observation well by zeroing its $Q_w$, while computing its unknown $P_w$, which may be expected to be 1,000 psi—the average of the edge pressures. Another observation well may be positioned into local cell {19, 19} of a Cartesian LGR inside global cell {2, 2} that is to be tested.

When tested, the wellbore pressure in the center well may be determined to be 1,000 psi. Both S-free and S-based MPWC models may determine results for the corner-well bottomhole pressure: $P_w$=664.346 psi. In another test, the Dirichlet boundary condition on the well-cell faces may be improved. The function $f(P_i, P_{i\pm})$ in Eq. 7b may be fixed to a constant value of $P_i$. The outer pressure field may be linear, but the well-cell boundary may treat it as constant. The choice of $f$ may not limited to constant functions and a boundary-value description may be used in terms of a linear function involving pressures of the outer cells sharing edges in 3D or corners in 2D with the current outer cell i:

$$f(P_i P_{i\pm}) = \frac{L-\gamma}{L}\frac{P_i + P_{i-1}}{2} + \frac{\gamma}{L}\frac{P_i + P_{i-1}}{2}, \tag{23}$$

$$\gamma \in [0, L].$$

Eq. 23 may be specific to the problem in question, and the usual cycling of indices may apply. Upon modifying the MPWC method by implementing Eq. 23 into their BIEs, both the S-free model and the S-based model predict the corner wellbore pressure to be $P_w$=657.143 psi, as expected. The linear function may be more representative of pressure gradients surrounding the well cell in general and may be preferred to the default constant $f$. Other schemes may be designed, even MPFA-type schemes involving nine points in the MPWC rather than five in 2D.

An explanation may be due regarding the role of support flow in the S-based solution of Example 3. No fluid may be flowing into/from the observation wells and hence $S_i$ may stay zero, but that is not what happens. The outer pressure gradient may be reflected on the well-cell faces and may be interpreted by the BIE as a non-zero flux through the domain. Although the inter-cell flow rate $Q_i$ may represents the flux correctly, pressure discontinuities between cells i and cell 0 may lead to non-zero values of $S_i$, although their overall balance is zero: $\Sigma_i S_i$=0. This may be a different issue from the one discussed in the first example. This may be addressed by computing a source-only support flow $S_i$ by subtracting the background support flow $\bar{S}_i$ from the original total $\tilde{S}_i$. In Example 3, $\tilde{S}_i = \bar{S}_i$ and hence $S_i$=0. The S-based model may behave similar to the S-free model after the background flow is eliminated from the former.

Example 4—Local Asymmetry Acting on Outer Cells

In Example 1-3, both MPWC models produce the same results, while the S-free model may have no additional unknowns and no associated issues to deal with. Example 4 may illustrate how the S-based model may propagate the local asymmetry outside the well cell. Example 4 may use the same domain geometry and rock/fluid properties as in the previous examples, as well as the producing well from the first example moved to a location of the corner well in the third example. In this example, the main extension may come in terms of another layer of FVM cells around the domain, resulting in a 5×5 global grid with the well-cell in the middle. The sixteen outermost cells may be kept at constant pressure of 1,000 psi, whilst their eight inner neighbors may be free to respond to the well-induced pressure changes in the single innermost cell.

For both symmetric and asymmetric well locations inside a 21×21 Cartesian LGR, the center and corner wells reside in local cells {11, 11} and {19, 19}, respectively. For the the S-based MPWC method (with $f=P_i$ in Eq. 7b and a double-integration via Eq. B-9), the wellbore pressures as 220 and 240 psi may be determined for the two respective wells. The calculated support flow rates may be −23.166 and 22.693 STB/D (with $U_i$=0.2365) for the cell faces closest to and furthest from the corner well, respectively. The S-based model, may reproduce the shift in the outer pressure profile, observed around the LGR. This may show the model's capability to broadcast a local asymmetry in the well cell (e.g., due to off-center well location, irregular cell shape, etc.) out to the adjacent cells through the additional support-flow variables.

Figure 5:
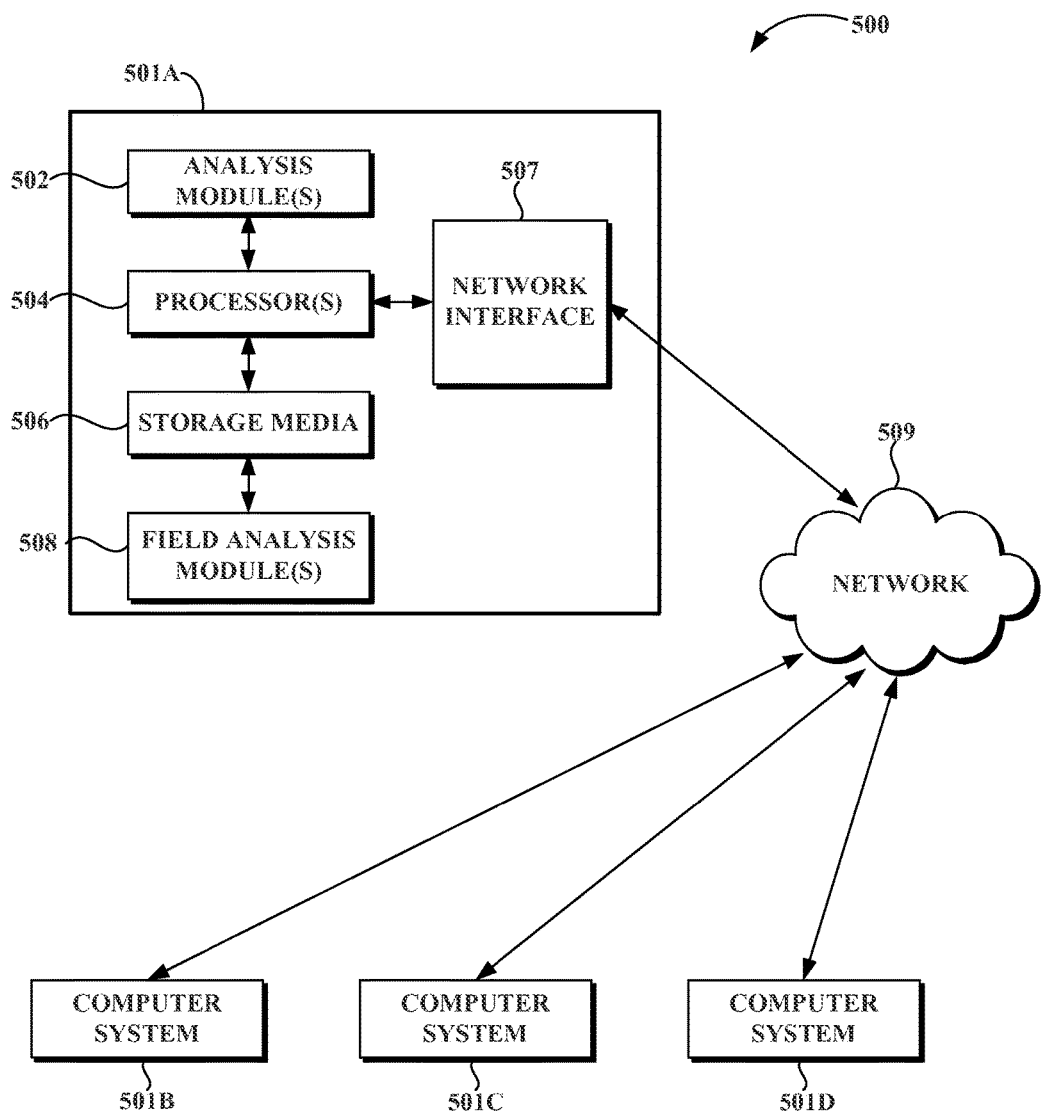
FIG. 5 illustrates a schematic view of a computing system according to an embodiment.

In some embodiments, the methods of the present disclosure may be executed by one or more computing systems. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains field analysis module 508. In the example of computing system 500, computer system 501A includes the drilling volume module 508. In some embodiments, a field analysis module may be used to perform some aspects of one or more embodiments of the method 300 disclosed herein. In alternate embodiments, a plurality of field analysis modules may be used to perform some aspects of method 300 herein.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

For reference, the list below provides a summary of notation used in equations discussion herein.

A, B=MPWC coefficients in Eq. 15
B=formation volume factor, RB/STB [rm$^3$/sm$^3$]
$c_t$=total compressibility, L.t$^2$/m, 1/psi [1/bar]
C=well connection coefficient, L$^4$.t/m
D=support flow coefficient, dimensionless
$f$=boundary condition function; default: $f=P_i$
F=(flux) free-space Green's function
g=acceleration due to gravity, 0.006944 ft$^2$.psi/lbm
G=(potential) free-space Green's function
$I_{k,l}$=boundary integral (Eq. 14) over $\Gamma_l$ with x' on $\Gamma_k$
h=formation thickness (or height), L, ft [m]
k=absolute rock permeability, L$^2$, md
K=k/µ, conductivity, L$^3$.t/m, md/cP
$K_N$=modified Bessel function of 2$^{nd}$ kind, of order N
L=length, L, ft [m]
m=number of well perforations in well cell
M=fluid mobility, L.t/m, 1/cP
n=number of outer cells surrounding well cell
n̂=unit outward normal to boundary Γ
p=pressure potential, m/L.t$^2$, psi [bar]

P=cell pressure potential, m/L.t², psi [bar]
q=macroscopic fluid velocity, L/t, ft/D [m/d]
Q=volumetric flow rate, L³/t, STB/D [sm³/d]
r=radius or Euclidean distance, L, ft [m]
R="anisotropic" distance, (m/L.t)⁻²
s=well skin factor, dimensionless
S=support flow rate, L³/t, STB/D [sm³/d]
t=time, t, D [d]
T=transmissibility, L³, RB.cP/D.psi [rm³.cP/d.bar]
u=unit conversion factor
U=uniform support flow rate, L³/t, STB/D [sm³/d]
V=volume, L³, ft³ [m³]
x, y, z=Cartesian coordinate, L, ft [m]
Greek and Other Symbols
γ=parameter of boundary F
Γ=boundary (of local flow problem)
δ=Dirac's delta function
Δ=difference
ζ=linear differential operator
κ=permeability ratio, dimensionless
μ=dynamic fluid viscosity, m/L.t, cP
ρ=mass fluid density, m/L³, lbm/ft³ [kg/m³]
σ=internal source
φ=effective rock porosity, dimensionless
ω=parameter of domain S
Ω=domain (of local flow problem)
Subscripts and Superscripts
0=well cell
i=cell (index); outer cell: i>0
n=normal component
s=well skin
w=well perforation
'=specified value
*="all types"

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method, comprising:
    determining, for a hydrocarbon field, one or more formation properties and one or more fluid properties;
    determining, for the hydrocarbon field, a location of one or more wells and a configuration of the one or more wells, wherein the one or more wells comprise at least one of an injecting well or a producing well;
    dividing the hydrocarbon field into one or more grid cells, wherein the one or more grid cells are associated with at least one of the one or more formation properties;
    simulating fluid flow in at least one of the one or more grid cells based on a multi-point well connection process, wherein the multi-point well connection process determines flow conditions between the one or more wells and the at least of the one or more grid cells based on flow conditions between the at least of the one or more grid cells and one or more neighboring grid cells, wherein simulating the fluid flow comprises:
        for each of the one or more grid cells, determining a first product of a well-perforation connection coefficient;
        summing the first product for each of the one or more grid cells;
        determining a second product of a well-perforation connection coefficient of the one or more wells and a well-perforation pressure of the one or more wells;
        subtracting the second product from the summed first product; and
        adding a flow contribution from internal sources; and
    determining one or more parameters of the one or more wells based at least in part on the fluid flow.

2. The method of claim 1, wherein the at least one of the one or more grid cells includes at least one of the one or more wells and wherein the multi-point well connection process represents a connection of the at least one of the one or more grid cells and the at least one of the one or more wells as multi-point representation of reservoir pressure.

3. The method of claim 1, wherein the multi-point well connection process comprises a support flow into one or more of the neighboring grid cells.

4. The method of claim 3, wherein the fluid flow is determined at least in part by an equation:

$$Q_w = \sum_{i=0}^{n} C_i P_i - C_w P_w + C_s + \sum_{i=1}^{n} D_i S_i.$$

where $D_i$ is a coefficient associated with $S_i$, and $S_i$ is a support flow rate between grid cell 0 and grid cell i.

5. The method of claim 1, wherein unspecified boundary conditions are determined at least in part based on a boundary integral equation.

6. The method of claim 1, the method further comprising:
    determining, based at least in part on the one or more parameters, a location of a new well in the hydrocarbon field.

7. The method of claim 1, wherein the fluid flow is also simulated at least in part by:
    determining a third product of a support flow rate between at least two of the one or more grid cells and a coefficient associated with the support flow rate; and
    summing the third product for a number of the one or more neighboring grid cells.

8. The method of claim 7, wherein the fluid flow is also simulated at least in part by:
    adding the summed third product to the flow contribution from the internal sources.

9. A non-transitory computer readable medium storing instructions for causing one or more processors to perform a method comprising:
    determining, for a hydrocarbon field, one or more formation properties and one or more fluid properties;
    determining, for the hydrocarbon field, a location of one or more wells and a configuration of the one or more wells, wherein the one or more wells comprise at least one of an injecting well or a producing well;
    dividing the hydrocarbon field into one or more grid cells, wherein the one or more grid cells are associated with at least one of the one or more formation properties;
    simulating fluid flow in at least one of the one or more grid cells based on a multi-point well connection process, wherein the multi-point well connection process determines flow conditions between the one or more wells and the at least of the one or more grid cells based on flow conditions between the at least of the one or more grid cells and one or more neighboring grid cells, wherein simulating the fluid flow comprises:
for each of the one or more grid cells, determining a first product of a well-perforation connection coefficient;
summing the first product for each of the one or more grid cells;
determining a second product of a well-perforation connection coefficient of the one or more wells and a well-perforation pressure of the one or more wells;
subtracting the second product from the summed first product; and
adding a flow contribution from internal sources; and
determining one or more parameters of the one or more wells based at least in part on the fluid flow.

10. The non-transitory computer readable medium of claim 9, wherein the at least one of the one or more grid cells includes at least one of the one or more wells and wherein the multi-point well connection process represents a connection of the at least one of the one or more grid cells and the at least one of the one or more wells as multi-point representation of reservoir pressure.

11. The non-transitory computer readable medium of claim 10, wherein the multi-point well connection process comprises a support flow into one or more of the neighboring grid cells.

12. The non-transitory computer readable medium of claim 11, wherein the fluid flow is determined at least in part by an equation:

$$Q_w = \sum_{i=0}^{n} C_i P_i - C_w P_w + C_s + \sum_{i=1}^{n} D_i S_i.$$

where $D_i$ is a coefficient associated with $S_i$, and $S_i$ is a support flow rate between grid cell 0 and grid cell i.

13. The non-transitory computer readable medium of claim 9, wherein unspecified boundary conditions are determined at least in part based on a boundary integral equation.

14. The non-transitory computer readable medium of claim 9, the method further comprising:
determining, based at least in part on the one or more parameters, a location of a new well in the hydrocarbon field.

15. A system, comprising:
one or more memory devices storing instructions; and
one or more processors coupled to the memory devices and configured to execute the instructions to perform a method comprising:
determining, for a hydrocarbon field, one or more formation properties and one or more fluid properties;
determining, for the hydrocarbon field, a location of one or more wells and a configuration of the one or more wells, wherein the one or more wells comprise at least one of an injecting well or a producing well;
dividing the hydrocarbon field into one or more grid cells, wherein the one or more grid cells are associated with at least one of the one or more formation properties;
simulating fluid flow in at least one of the one or more grid cells based on a multi-point well connection process, wherein the multi-point well connection process determines flow conditions between the one or more wells and the at least of the one or more grid cells based on flow conditions between the at least of the one or more grid cells and one or more neighboring grid cells, wherein simulating the fluid flow comprises:
for each of the one or more grid cells, determining a first product of a well-perforation connection coefficient and a pressure;
summing the first product for each of the one or more grid cells;
determining a second product of a well-perforation connection coefficient of the one or more wells and a well-perforation pressure of the one or more wells;
subtracting the second product from the summed first product; and
adding a flow contribution from internal sources; and
determining one or more parameters of the one or more wells based at least in part on the fluid flow.

16. The system of claim 15, wherein the at least one of the one or more grid cells includes at least one of the one or more wells and wherein the multi-point well connection process represents a connection of the at least one of the one or more grid cells and the at least one of the one or more wells as multi-point representation of reservoir pressure.

17. The system of claim 15, wherein the multi-point well connection process comprises a support flow into one or more of the neighboring grid cells.

18. The system of claim 17, wherein the fluid flow is determined at least in part by an equation:

$$Q_w = \sum_{i=0}^{n} C_i P_i - C_w P_w + C_s + \sum_{i=1}^{n} D_i S_i.$$

where $D_i$ is a coefficient associated with $S_i$, and $S_i$ is a support flow rate between grid cell 0 and grid cell i.

19. The system of claim 15, wherein unspecified boundary conditions are determined at least in part based on a boundary integral equation.

* * * * *